(12) United States Patent
Seiders, Jr.

(10) Patent No.: US 11,771,002 B2
(45) Date of Patent: Oct. 3, 2023

(54) METHOD AND SYSTEM FOR CALIBRATING A HEIGHT CONTROL SYSTEM FOR AN IMPLEMENT OF AN AGRICULTURAL WORK VEHICLE

(71) Applicant: CNH Industrial America LLC, New Holland, PA (US)

(72) Inventor: Kenneth Seiders, Jr., Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 1077 days.

(21) Appl. No.: 16/548,199

(22) Filed: Aug. 22, 2019

(65) Prior Publication Data
US 2021/0051850 A1  Feb. 25, 2021

(51) Int. Cl.
*A01D 41/127* (2006.01)
*A01D 41/14* (2006.01)
*G06Q 50/02* (2012.01)

(52) U.S. Cl.
CPC ....... *A01D 41/1274* (2013.01); *A01D 41/141* (2013.01); *A01D 41/145* (2013.01); *G06Q 50/02* (2013.01)

(58) Field of Classification Search
CPC ............................ A01D 41/141; A01B 63/008
See application file for complete search history.

(56) References Cited

U.S. PATENT DOCUMENTS 9,668,412 B2   6/2017 Ritter et al.
2017/0245434 A1  8/2017 Jung et al.

FOREIGN PATENT DOCUMENTS

WO   WO-2014127043 A1 *  8/2014 ........... A01D 34/006

OTHER PUBLICATIONS

J.G. Ziegler et al., "Optimum Settings for Automatic Controllers," Transactions of the A.S.M.E., Nov. 1942, 759-768 (10 pages).

* cited by examiner

*Primary Examiner* — James M McPherson
*Assistant Examiner* — Kyle J Kingsland
(74) *Attorney, Agent, or Firm* — Peter Zacharias (57) ABSTRACT

A method for calibrating a height control system for an implement of an agricultural work vehicle can include providing an input signal to the height control system to adjust a height of the implement relative to the ground surface; monitoring the height of the implement relative to the ground surface; adjusting at least one gain of the height control system; and determining a maximum stability gain of the height control system based on the at least one gain and the monitored height. The maximum stability gain can correspond with a stability point of the height control system at which the height control system transitions from stable to unstable. The method can include setting gain(s) of the height control system based on the maximum stability gain.

14 Claims, 6 Drawing Sheets

METHOD AND SYSTEM FOR CALIBRATING A HEIGHT CONTROL SYSTEM FOR AN IMPLEMENT OF AN AGRICULTURAL WORK VEHICLE

FIELD OF THE INVENTION

The present subject matter relates generally to height control systems for agricultural implements, and, more particularly, to a method and system for calibrating a height control system for an implement of an agricultural work vehicle.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine; and/or the like. To address such issues, many current combines utilize an automatic header height and tilt control system to maintain a constant cutting height above the ground regardless of the ground contour or ground position relative to the base combine. For instance, it is known to utilize electronically controlled height and tilt cylinders to automatically adjust the height and lateral orientation, or tilt, of the header relative to the ground based on sensor measurements. However, such systems often exhibit significant lag and slow response times, particularly when the harvester is operating at high ground speeds. The parameters of such systems can be selected to improve performance. Determining optimal parameters of such a control system, however, can be difficult.

Accordingly, an improved method and related system for calibrating a height control system for an implement of an agricultural work vehicle that addresses one or more of the issues identified above would be welcomed in the technology.

BRIEF DESCRIPTION OF THE INVENTION

Aspects and advantages of the invention will be set forth in part in the following description, or may be obvious from the description, or may be teamed through practice of the invention.

In one aspect, the present subject matter is directed to a method for calibrating a height control system for an implement of an agricultural work vehicle can include providing an input signal to the height control system to adjust a height of the implement relative to the ground surface; monitoring the height of the implement relative to the ground surface; adjusting at least one gain of the height control system; and determining a maximum stability gain of the height control system based on the at least one gain and the monitored height. The maximum stability gain can correspond with a stability point of the height control system at which the height control system transitions from stable to unstable. The method can include setting gain(s) of the height control system based on the maximum stability gain.

In another aspect, the present subject matter is directed to a height control system for an implement of an agricultural work vehicle. The height control system can include an implement and an implement height sensor configured to detect a height of the implement relative to a ground surface. The height control system can include an implement controller communicatively coupled to the implement height sensor. The implement controller can include a processor and associated memory. The memory can store instructions that, when executed by the processor, configure the implement controller to perform operations. The operations can include providing an input signal to the height control system to adjust the height of the implement relative to the ground surface; monitoring the height of the implement relative to the ground surface based on signals received from the implement height sensor; adjusting at least one gain of the height control system; and determining a maximum stability gain of the height control system based on the at least one gain and the monitored height. The maximum stability gain can correspond with a stability point of the height control system at which the height control system transitions from stable to unstable. The operations can include setting the gain(s) of the height control system based on the maximum stability gain.

In a further aspect, the present subject matter is directed to a height control system for an implement of an agricultural work vehicle. The height control system can include an implement and an implement height sensor configured to detect a height of the implement relative to a ground surface. The height control system can include an implement controller communicatively coupled to the implement height sensor. The implement controller can include a processor and associated memory. The memory can store instructions that, when executed by the processor, configure the implement controller to perform operations. The operations can include monitoring the height of the implement relative to the ground surface based on signals received from the implement height sensor; determining an implement height error by comparing the height of the implement with a predetermined target height; calculating an output signal based on the implement height based on at least one gain of the implement controller; and adjusting the height of the implement based on the output signal. The gain(s) of implement controller can have been calibrated by providing an input signal to the implement controller; monitoring the height of the implement relative to the ground surface; adjusting the gains) of the implement controller; determining a maximum stability gain of the implement controller based on the at least one gain; and setting the gain(s) of the implement controller based on the determined maximum stability gain.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF TI-IE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method for calibrating a height control system for an implement of an agricultural work vehicle. The calibration method can be performed between agricultural operations (e.g., harvesting operations), for example, while the work vehicle is stationary. The height control system can be configured to implement a proportional-integral ("PI") or proportional-integral-derivative ("PID") control loop to adjust the height of the implement during an agricultural operation. An input signal (e.g., a step input) can be input to the height control system to adjust a height of the implement relative to the ground surface. The response of the height control system to the input signal can be measured. More specifically, the method can include monitoring the height of the implement relative to the ground surface. An implement height sensor can detect the height of the implement as the vehicle control system adjusts the height of the implement in response to the input signal. One or more gains of the height control system can be automatically set based on a maximum stability gain of the height control system. The maximum stability gain can correspond with a stability point of the height control system at which the height control system transitions from stable to unstable, for example as described below with reference to FIGS. 5 and 6. The gain(s) of the height control system can be selected to provide desirable response characteristics for the particular properties and/or dynamics of the height control system, such as the weight of the header. As an example, the gain(s) of can include one or more of a proportional signal gain, an integral signal gain, and a derivative signal gain.

In one embodiment, one or more gains of the system can be determined by increasing the gain(s) until it is approximately equal to the maximum stability gain. An operational gain(s) of the height control system can then be calculated based on the maximum stability gain, for example, using predetermined relationships, equations, look-up tables, etc. Some or all of the steps can be performed automatically by the height control system. Thus, a desirable and/or optimal gain(s) for the height control system can be quickly and/or automatically determined according to aspects of the present disclosure.

Figure 1:
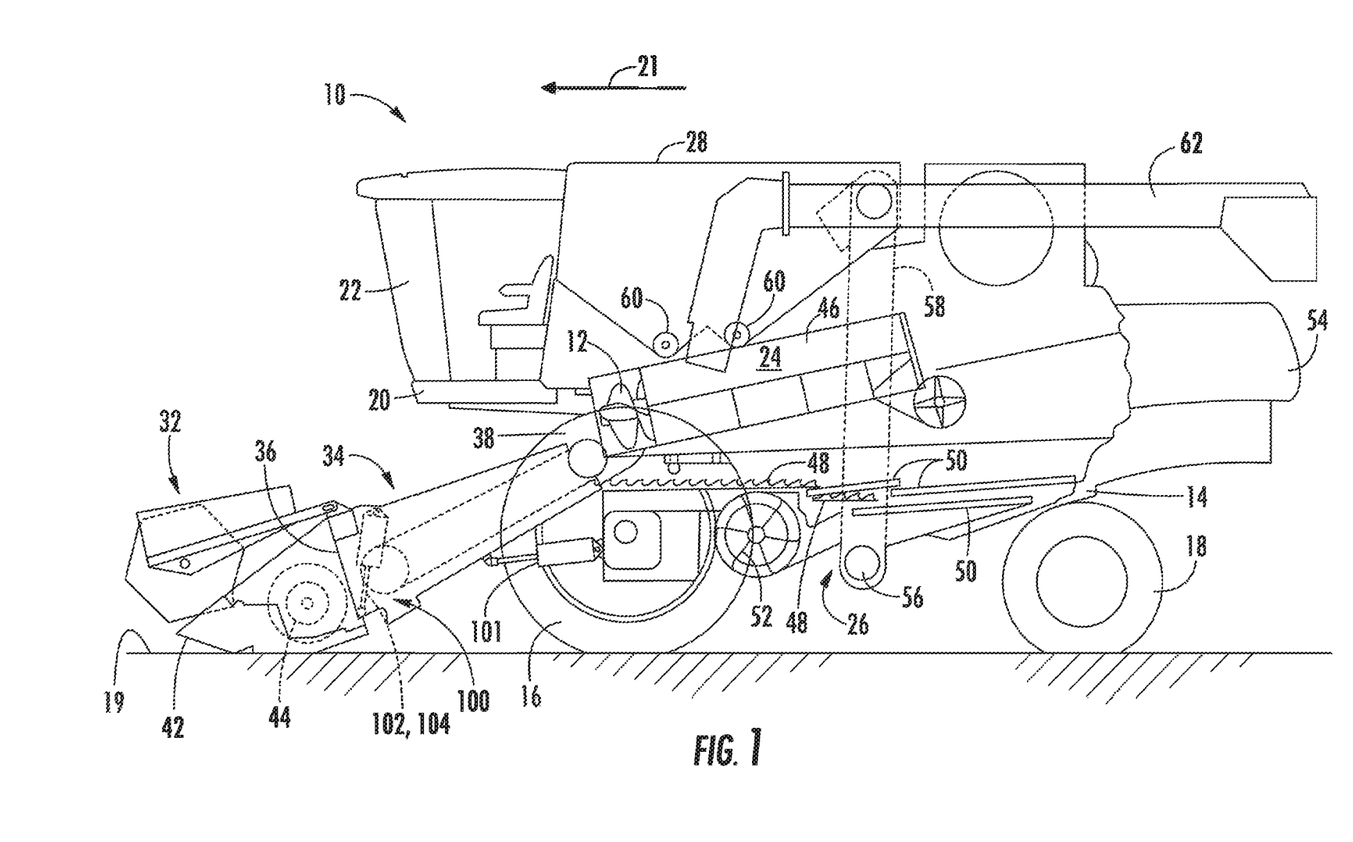
FIG. 1 illustrates a simplified, partial sectional side view of one embodiment of an agricultural vehicle in accordance with aspects of the present subject matter.

Referring now to the drawings, FIG. 1 illustrates a simplified, partial sectional side view of one embodiment of a work vehicle, a harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement 21 relative to the ground surface 19. Additionally, an operator's platform 20 with an operator's cab 22, a threshing and separating assembly 24, a grain cleaning assembly 26, and a holding tank 28 may be supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 100 which is configured to adjust a height of the header 32 relative to the ground 19 so as to maintain the desired cutting height between the header 32 and the ground 19. The hydraulic system 100 may include a height control cylinder 101 configured to adjust the height of the header 32 relative to the ground. For example, in some embodiments, the height control cylinder 101 may be coupled between the feeder 34 and the frame 14 such that the height control cylinder 101 may pivot the feeder 34 to raise the header 32 relative to the ground 19. In some embodiments, hydraulic system 100 may include first and second tilt cylinders 102, 104 coupled between the header 32 and the feeder 34 to allow the header 32 to be tilted relative to the ground 19 or pivoted laterally or side-to-side relative to the feeder 34.

Figure 2:
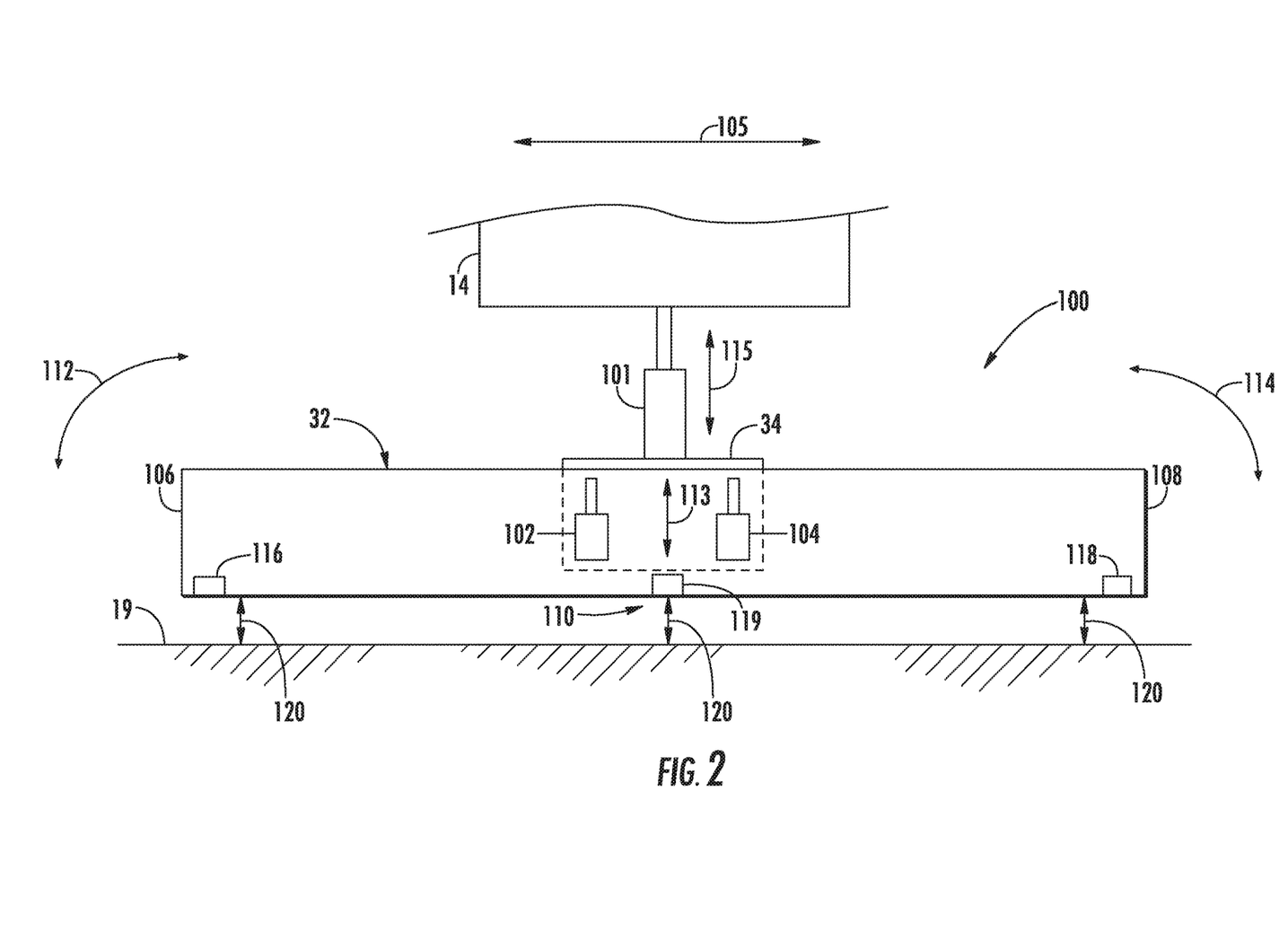
FIG. 2 illustrates a simplified, schematic view of one embodiment of a hydraulic system for an agricultural harvester in accordance with aspects of the present subject matter.

Referring now to FIG. 2, a simplified, schematic view of one embodiment of the hydraulic system 100 described above with reference to FIG. 1 is illustrated in accordance with aspects of the present subject matter. As shown, the header 32 may generally extend side-to-side or in a lengthwise direction (indicated by arrow 105 in FIG. 2) between a first lateral end 106 and a second lateral end 108. Additionally, the header 32 may be coupled to the feeder 34 at a location between its first and second lateral ends 106, 108 to allow the header 32 to tilt laterally relative to the feeder 34 (e.g., as indicated by arrows 112, 114 in FIG. 2). For example the header 32 may be coupled to the feeder 34 roughly at a center 110 of the header 32. The height control cylinder 101 may be configured to raise and lower the end of the feeder 34 relative to the frame 14 of the harvester (e.g., as indicated by arrow 115). The lateral tilt cylinders 102, 104 may be configured to laterally tilt the header 32 relative to the ground 19 (e.g., as indicated by arrows 112, 114). In some embodiments, the tilt cylinders 102, 104 may also be configured to raise and lower the header 32 with respect to the feeder 34 (e.g., as indicated by arrow 113).

As indicated above, the hydraulic system 100 may include the height control cylinder 101 and one or more tilt cylinders 102, 104. For instance, as shown in the illustrated embodiment, a first tilt cylinder 102 may be coupled between the header 32 and the feeder 34 along one lateral side of the connection between the header 32 and the feeder 34, and a second tilt cylinder 104 may be coupled between the header 32 and the feeder 34 along the opposed lateral side of the connection between the header 32 and the feeder 34. In general, the operation of the height control cylinder 101 and tilt cylinders 102, 104 may be controlled (e.g., via an associated controller) to adjust the height and angle of the header 32 relative to the ground 19. For instance, one or more height sensors 116, 118, 119 may be provided on the header 32 to monitor one or more respective local distances or heights 120 defined between the header 32 and the ground 19. Specifically, as shown in FIG. 2, a first height sensor 116 may be provided at or adjacent to the first lateral end 106 of the header 32, and a second height sensor 118 may be provided at or adjacent to the second lateral end 108 of the header 32. In some embodiments, a third height sensor 119 may be provided at or adjacent the center 110 of the header 32. In such an embodiment, when one of the height sensors 116, 118, 119 detects that the local height 120 defined between the header 32 and the ground 19 differs from a desired height (or falls outside a desired height range), the height control cylinder 101 and/or the tilt cylinders 102, 104 may be actively controlled so as to adjust the height and/or tilt of the header 33 in a manner that maintains the header 32 at the desired height (or within the desired height range) relative to the ground 19. In some embodiments, the desired height may be an average, weighted average, or other suitable mathematical combination of the local heights 120 measured by one or more of the height sensors 116, 118, 119.

Figure 3:
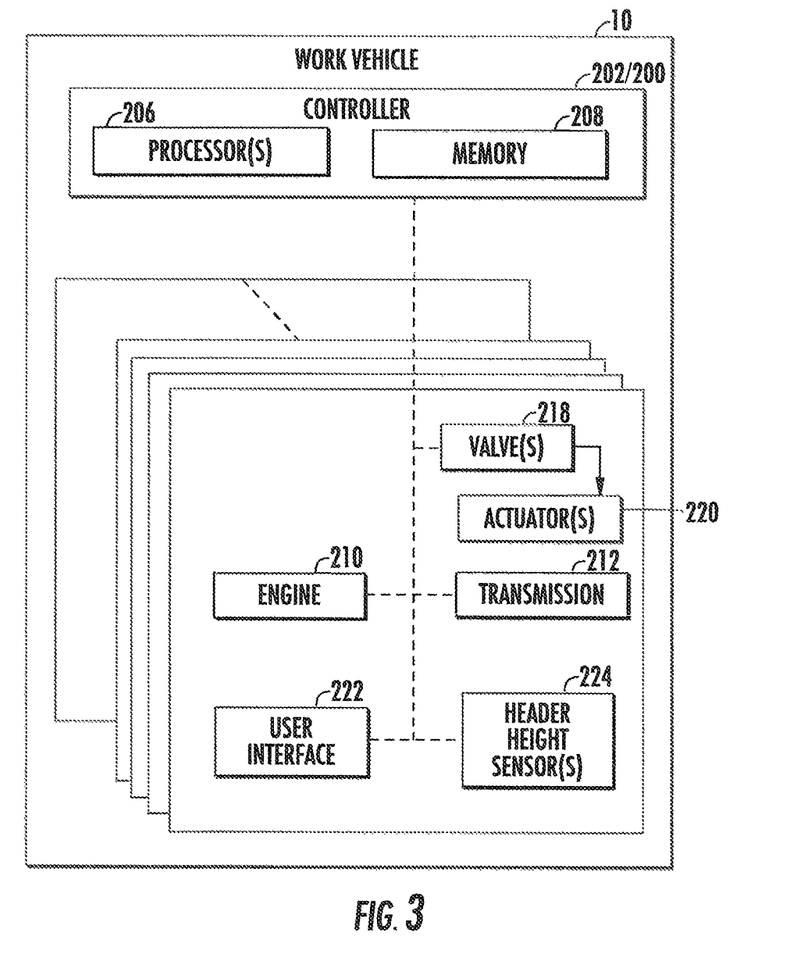
FIG. 3 illustrates a schematic view of one embodiment of a system for calibrating a height control system for an implement of an agricultural work vehicle in accordance with aspects of the present subject matter.

Referring now to FIG. 3, a schematic view of one embodiment of a control system 200 is provided for automatically controlling the height of an agricultural implement (such as the header 32 of the harvester 10 described above) relative to the ground 19 in accordance with aspects of the present subject matter. In general, the control system 200 will be described herein with reference to the harvester 10 and header 32 illustrated in FIG. 1. However, it should be appreciated that the disclosed control system 200 may be implemented to control the height of any suitable agricultural implement associated with a work vehicle having any other suitable configuration.

As shown, the control system 200 may generally include a controller 202 installed on and/or otherwise provided in operative association with the harvester 10 and/or the implement (e.g., header 32). In general, the controller 202 of the disclosed system 200 may correspond to any suitable processor-based device(s), such as a computing device or any combination of computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 of the controller 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206 configure the controller 202 to perform various computer-implemented functions, such as one or more aspects of a method 400 for controlling the height of the implement described below with reference to FIG. 4.

In addition, the controller 202 may also include various other suitable components, such as a communications circuit or module, a network interface, one or more input/output channels, a data/control bus and/or the like, to allow the controller 202 to be communicatively coupled with any of the various other system components described herein. In some embodiments, the controller 202 may be configured to monitor and/or control the engine 210 and transmission 212 of the harvester 10.

Referring still to FIG. 3, the controller 202 may generally be configured to control the operation of one or more components of the harvester 10. For instance, in several embodiments, the controller 202 may be configured to control the operation of one or more components that regulate the height of the header 32 relative to the ground 19, For example, the controller 202 may be communicatively coupled to one or more control valve(s) 218 configured to regulate the supply of fluid (e.g., hydraulic fluid or air) to one or more corresponding actuators) 220. In some embodiments, the actuators 220 may correspond with the height control cylinder 101, first tilt cylinder 102, and/or second tilt cylinder 104. The control valve(s) 218 may correspond with one or more valves associated with the cylinder(s) 101, 102, 104.

Moreover, as shown in the illustrated embodiment, the vehicle controller 202 may be communicatively coupled to a user interface 222 of the harvester 10. In general, the user interface 222 may correspond to any suitable input devices) configured to allow the operator to provide operator inputs to the vehicle controller 202, such as a touch screen display, a keyboard, joystick, buttons, knobs, switches, and/or combinations thereof located within the cab 22 of the harvester 10. The operator may provide various inputs into the system 200 via the user interface 222. In one embodiment, suitable operator inputs may include, but are not limited to, a target height for the implement, a crop type and/or characteristic indicative of a suitable target header height, and/or any other parameter associated with controlling the height of the implement.

Additionally, controller 202 may also be communicatively coupled to the various sensors associated the header 32. For instance, as shown in FIG. 3, the controller 202 may be coupled to one or more header height sensor(s) 224 configured to monitor the height of the header 32 relative to the ground 19. In one embodiment, the header height sensor(s) 224 may correspond to one or more of the one or more height sensors 116, 118, 119 configured to monitor local distance(s) or height(s) 120 defined between the header 32 and the ground 19.

Figure 4:
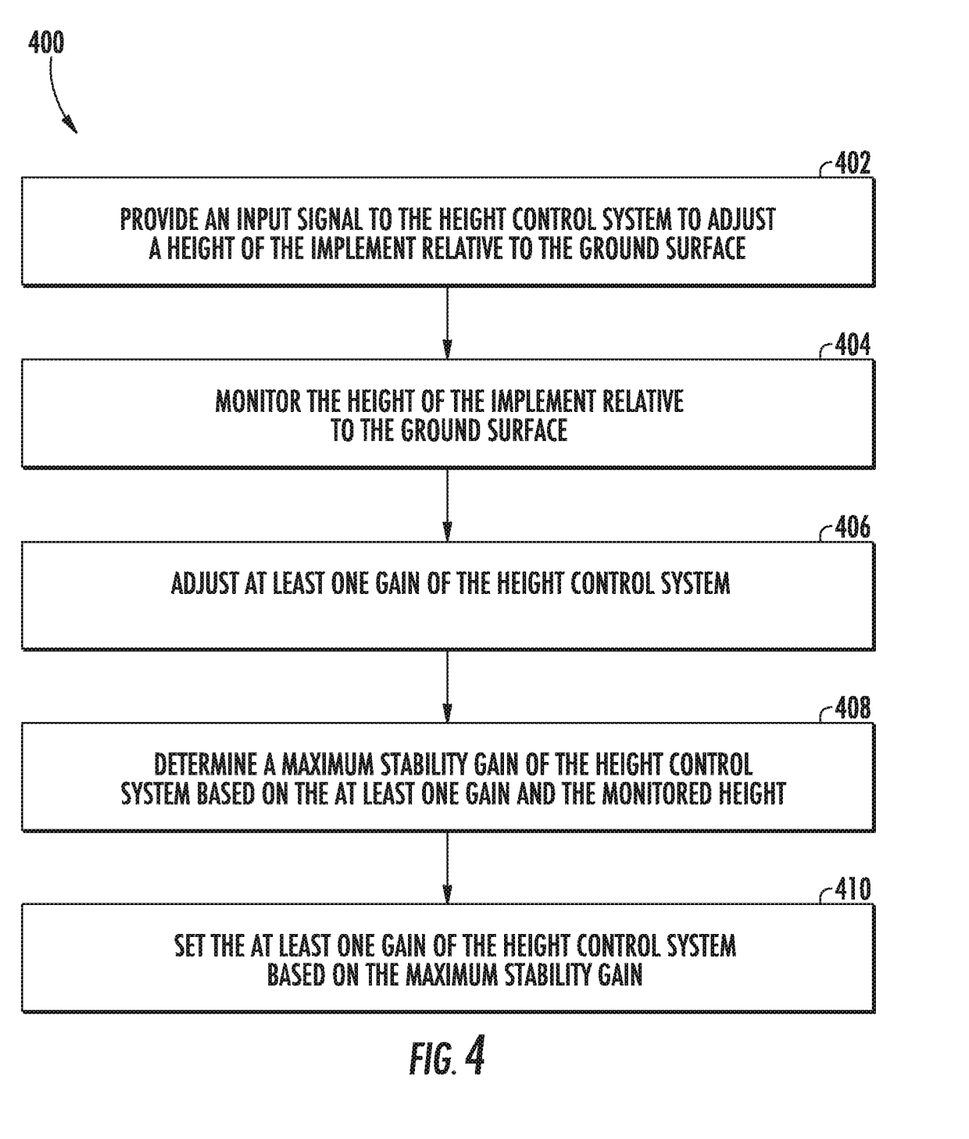
FIG. 4 illustrates a flow diagram showing one embodiment of a method for calibrating a height control system for an implement of an agricultural work vehicle in accordance with aspects of the present subject matter.

Referring now to FIG. 4, a flow diagram of one embodiment of a method 400 for calibrating a height control system for an implement of an agricultural work vehicle is illustrated in accordance with aspects of the present subject matter. Although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 400 will generally be described herein with reference to the harvester 10 and header 32 shown in FIG. 1, as well as the various system components shown in FIG. 3. However, it should be appreciated that the disclosed method 400 may be implemented to control the height of any suitable agricultural implement associated with a work vehicle having any other suitable configuration and may be used in connection with any system having any suitable system configuration.

Referring to FIG. 4, the method 400 may include, at (402), providing an input signal to the height control system 200 (e.g., controller 202) to adjust a height 120 of the implement (e.g., header 32) relative to the ground surface 19. The input signal can include a signal commanding the controller 202 to increase or decrease the height 120 of the header 32 by a predetermined distance. For instance, the input signal can include a step input signal, a ramp input signal, or other suitable input signal that causes the header 32 to be moved from a first height relative to the ground surface 19 to a second, different height relative to the ground surface 19. In some implementations, the input signal can include a repeating pattern, such as a sinusoidal pattern.

The method 400 may include, at (404), monitoring the height of the implement (e.g., header 32) relative to the ground surface 19. For example, the controller 202 may receive signals from the header height sensor(s) 224 (e.g., height sensors 116, 118, 119 configured to monitor local distance(s) or height(s) 120 defined between the header 32 and the ground 19). The controller 202 may be configured to receive signals from the height sensor(2) 224 and convert the signals into a measurement.

In some implementations, the input signal can be provided to the height control system 200 and/or the height 120 of the implement (e.g., header 32) relative to the ground surface 19 can be monitored while the agricultural work vehicle 10 is stationary. For instance, the method 400 can be performed in a headland or area adjacent a field in which an agricultural operation (e.g., harvesting) is to be performed. The method 400 can be performed after changing the implement of the work vehicle or otherwise adjusting the configuration or settings of the work vehicle or height control system 200. Generally, the method 400 is performed while the vehicle 10 is stationary. However, in alternative embodiments, the method 400 can be performed while the vehicle 10 is moving.

The method 400 may include, at (406), adjusting (e.g., increasing) at least one gain of the height control system (e.g., controller 202). Example gains that can be adjusted (e.g., increased) include a proportional signal gain associated with a proportional signal, an integral signal gain associated with an integral signal, and a derivative signal gain associated with a derivative signal of the height control system 200 (e.g., controller 202). As one example, the proportional signal gain can be increased while the integral and/or derivative signal gains are held constant (e.g., are set to zero). As additional examples, the integral and/or derivative signal gains can be increased, and/or the proportional signal gain can be held constant (e.g., set to zero).

The method 400 may include, at (408), determining a maximum stability gain of the height control system 200 based on the adjusted gain and the monitored height. The maximum stability gain may correspond with a stability point of the height control system 200 at which the height control system 200 transitions from stable to unstable, for example as described below with reference to FIGS. 5 and 6. In some embodiments, the height control system 200 can automatically increase the gain(s) of the height control system 200 and automatically determine when the maximum stability gain has been reached, for example, by analyzing the time-varying height of the implement (e.g., as described below with reference to FIGS. 5 and 6). In other embodiments, however, the operator can manually control one or more aspects of the calibration procedure. For example, the operator can observe the procedure and can perform an input action when the operator observes that the maximum stability gain has been reached. This approach can allow the operator to adjust the performance of the system.

For instance, the operator can cause the calibration procedure to result in slightly lower gains for a slightly more stable and less responsive response. The operator can indicate that the maximum stability gain has been reached at a slightly lower gain level (e.g., earlier in the process of increasing the gain(s) until the maximum stability gain is reached). This can allow the operator to calibrate the height control system 200 to be slightly more stable and less responsive or aggressive (e.g., slower). On the other hand, the operator can indicate that the maximum stability gain has been reached at a gain closer to the actual maximum stability gain, resulting in the height control system 200 being more responsive or aggressive (e.g., faster) but less stable.

The method 400 may include, at (410), setting the gain(s) of the height control system 200 based on the maximum stability gain. In some implementations, an oscillation period of the height control system 200 at the maximum stability gain may be measured and/or stored, for example as described below with reference to FIG. 6. The gain(s) of the height control system 200 can be calculated based on the maximum stability gain. For example, gain(s) of the height control system 200 can be looked up and/or calculated using a look-up table based on the maximum stability gain. For example, Table 1 shows values for proportional signal gain, $K_p$, integral signal gain, $K_i$, and derivative signal gain, $K_d$, based on the maximum stability gain, $K_{ms}$, and oscillation period, $T_u$, at the maximum stability gain.

In some implementations, the gain(s) of the height control system 200 can be iteratively increased to determine the maximum stability gain. For example, step input signals can be iteratively provided to the height control system 200 and the gain(s) of the height control system 200 can be iteratively increased concurrently. For example, a first input signal can be provided while the gain(s) (e.g., proportional signal gain) of the height control system 200 is set at a first gain value or values. The height 120 of the implement (e.g., header 32) can be monitored as the height control system 200 adjusts the height 120 of the header 32 in response to the first input signal. The gain(s) of the height control system 200 can be increased to a second gain value or values. A second input signal can be provided while the gain(s) of the height control system 200 is at the second gain value(s). The height 120 of the implement (e.g., header 32) can again be monitored as the height control system 200 adjusts the height 120 of the header 32 in response to the second input signal. This process can be repeated until the gain(s) of the height control system 200 is approximately equal to the maximum stability gain (or gains) of the height control system. For instance the proportional signal gain can be increased until the maximum stability is reached while other gains are set to zero. At that point, the current gain(s) of the height control system 200 can be stored in the memory 208 of the height control system 200 and/or communicated for storage in another non-transitory computer-readable media.

In several embodiments, the height control system 200 may be configured as a PID controller in which one or more of the gains of the PID controller is determined based on the maximum stability gain of the height control system 200. The following equation shows the output signal, u(t), of a PID controller in accordance with aspects of the present disclosure, where e(t) represents an implement height error as a function of time, t; and $K_p$, $K_i$, and $K_d$ represent respective constant gains for each of the proportional, integral, and derivative signal components:

$$u(t) = K_p e(t) + K_i \int e(t) dt + K_d \frac{de}{dt} \quad (1)$$

The implement height error is a difference between a monitored implement height and an input signal instructing the PID controller loop to set the implement height at a specific height. In other implementations, the controller can be a proportional (P) or proportional-integral (PI) or proportional-derivative (PD) controller. In other words, one or more of the proportional gain, integral gain, and/or derivative gain can be set equal to zero.

Figure 5:
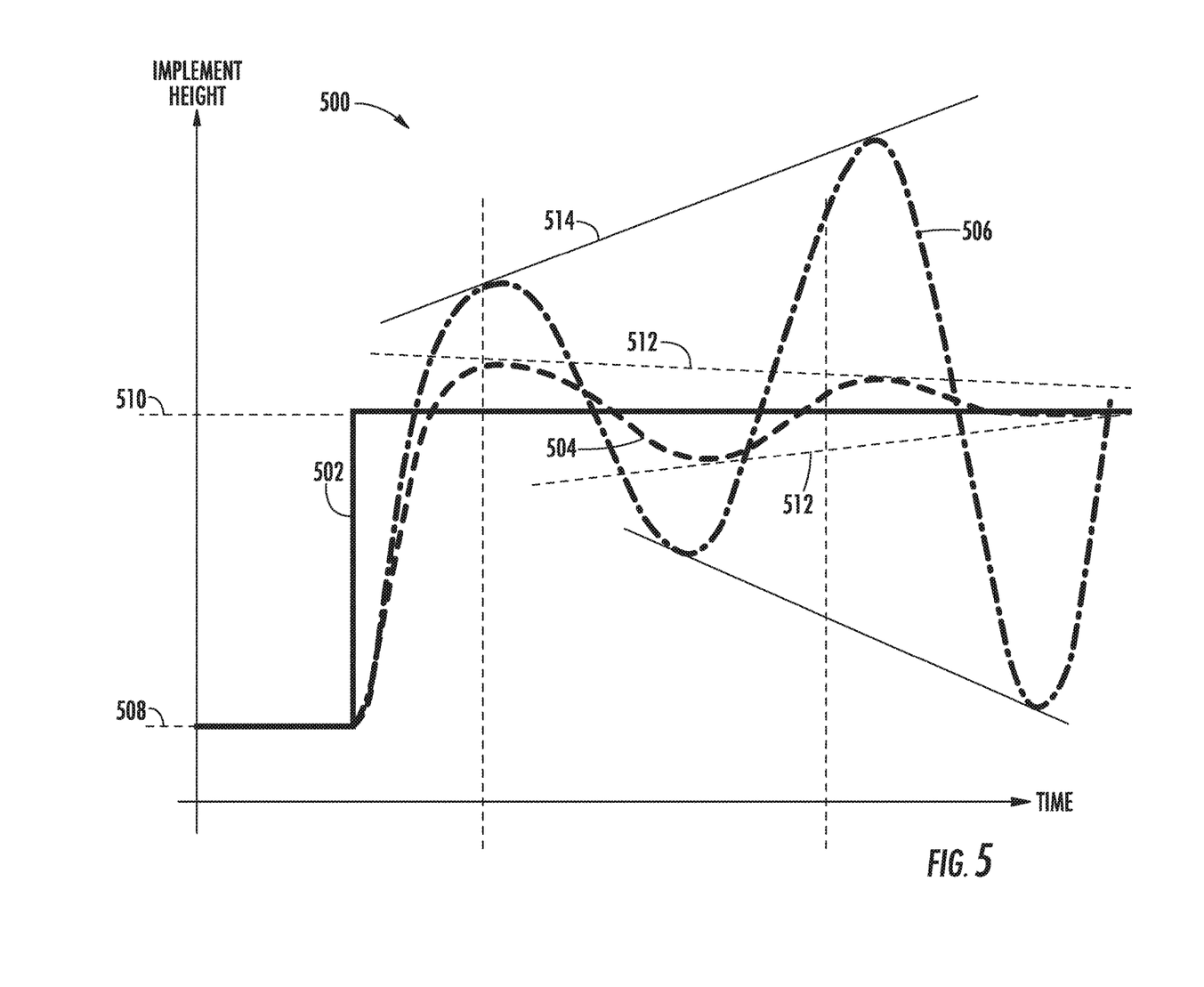
FIG. 5 provides a simplified example plot of an input signal, a first monitored implement height for a first gain that is less than the maximum stability again, and a second monitored implement height for a second gain that is greater than a determined maximum stability gain, in accordance with aspects of the present subject matter.

FIG. 5 provides a simplified example plot 500 of an input signal 502 and a first monitored implement height 504 for a first gain that is less than the maximum stability gain and a second monitored implement height 506 for a second gain that is greater than the maximum stability gain. The input signal 502 can include a step from a first implement height 508 to a second implement height 510. In response to the input signal 502, the first monitored implement height 504 overshoots the second implement height 510 and oscillates about the second implement height 510. As the first gain is less than the maximum stability gain, the first monitored height 506 eventually converges at the second implement height 510 (illustrated by dotted lines 512).

In contrast, the second implement height 506 corresponds with a second gain that is greater than the maximum stability gain. As such, oscillations of the second implement height 506 increase in magnitude over time (illustrated by dotted lines 514), resulting in instability of the height control system 200. In other words, the second implement height 506 diverges, illustrating that the height control system 200 is unstable. Such instability can cause damage to the height control system 200, for example by damaging the actuators used to control the implement height.

Figure 6:
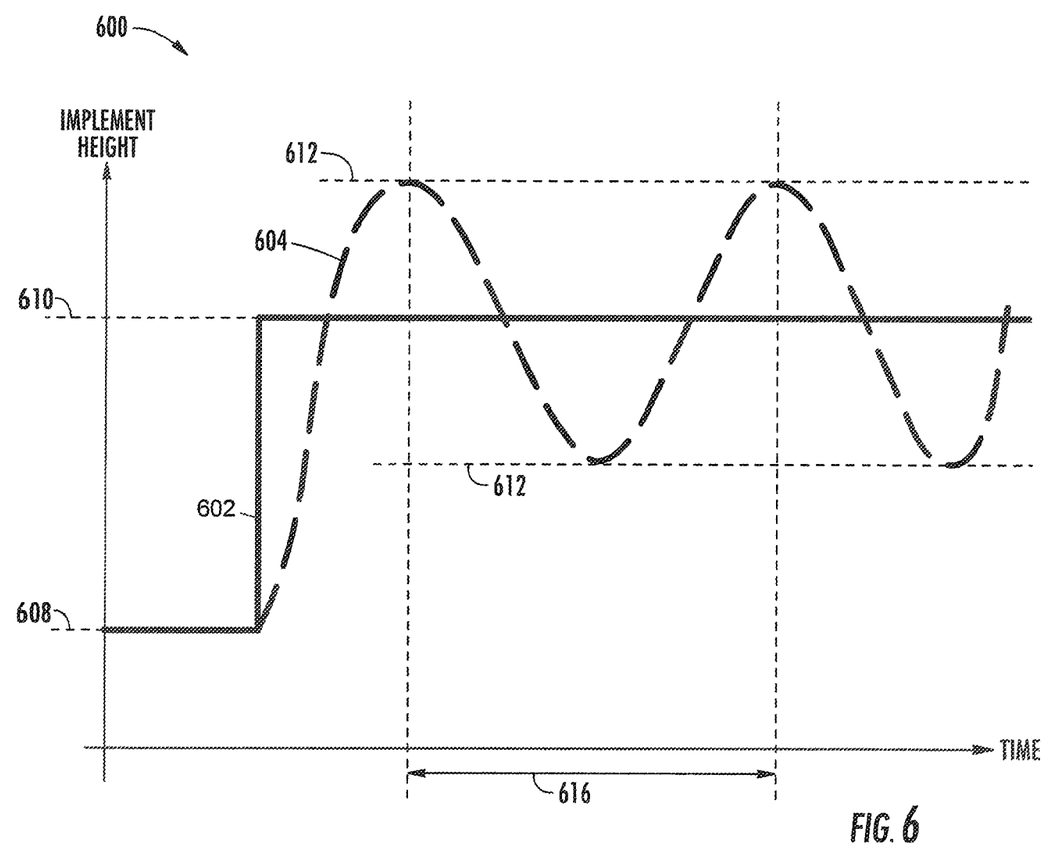
FIG. 6 provides a simplified example plot of an input signal and a third monitored implement height for a third gain that is approximately equal to a determined maximum stability gain, in accordance with aspects of the present subject matter.

FIG. 6 provides a simplified example plot 600 of an input signal 602 and a third monitored implement height 604 for a third gain that is approximately equal to the maximum stability gain. The input signal 502 can include a step from a first implement height 608 to a second implement height 610. As illustrated, the third monitored implement height 604 can oscillate about the second implement height 610. The third monitored implement height 604, however, neither converges nor diverges. Rather, as illustrated by the dotted lines 612, the third monitored implement height 604 can oscillate in a steady state condition (e.g., as a sinusoidal signal).

An oscillation period 616 of the third monitored implement height 604 can be determined by timing the oscillations (e.g., from peak to peak). As indicated above, the gains) of the control system 200 can be increased until approximately equal to the maximum stability gain (e.g., equal to the third gain). The gain and oscillation period 616 can be stored. The operational gain(s) of the control system 200 can be set based on the third gain.

Aspects of the present disclosure are also directed to the height control system 200 that has been calibrated according to aspects of the present disclosure. The height control system 200 can be configured to adjust the height of the implement using a PI or PID loop having one or more gains determined based on the maximum stability gain.

Additionally, the height control system 200 can be configured to adjust the angle of the implement relative to the ground (e.g., lateral tilt and/or fore/aft tilt) to account for ground unevenness. For example, the height control system 200 may be configured to adjust the height of the implement (e.g., header 32) based on the inputs from height sensor(s) 116, 118, 119. As indicated above, in some embodiments, the tilt cylinders 102, 104 may be capable of adjusting the angle of the header 32 of the harvester 10. For example, the controller 202 of the height control system 200 may be configured to adjust the local height(s) 120 measured at the center 110 of the header 32, using the height control cylinder(s) 101. Additionally, in some embodiments, the controller 202 may be configured to adjust the local height(s) 120 of the header 32 at each end 106, 108 of the header 32 using the tilt cylinders 102, 104. Moreover, in some embodiments, the controller 202 may be configured to perform discrete or linked control loops for each of the local heights 120 of the header 32 using any suitable technique or combination of techniques described herein to adjust the lateral tile and/or fore/aft tilt of the header 32. For instance, distinct respective gains for the discrete control loops can be determined using the techniques described herein.

The maximum stability gain of the height control system 200 can vary depending on the properties and dynamics of the system, which can include the weight of the implement (e.g., header 32), center or gravity of the implement, and/or other characteristics of the implement, harvester 10, or height control system 200. Thus, the gain(s) that is determined based on the maximum stability gain can similarly vary based on the characteristics of the implement, among other variables.

In some embodiments, the height control system 200 can be configured to extrapolate appropriate gains for a substitute implement, for example, based on the weight, center of gravity, etc. of the original implement and the weight, center of gravity, etc. of the substitute implement. The operator can perform the calibration procedure with the first, original implement connected with the work vehicle. Later, if the operator wishes to swap the original implement for a substitute implement, the operator can avoid performing some or all steps of the calibration procedure again for the substitute implement. Instead, the operator can input properties (e.g., weight, center of gravity, etc.) of the original implement and properties of the substitute implement. Alternatively, the operator can input model information about the one or both of the implements, and the height control system 200 can determine the relevant properties of the implement(s), for example from a look-up table, through an Internet interface, etc. The height control system 200 can extrapolate appropriate gain(s) for the substitute implements based on their characteristics such that the substitute implement can be used without performing a completely new calibration procedure for the substitute implement.

It is to be understood that, in several embodiments, the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 202 described herein, such as the method 300, are implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for calibrating a height control system for an implement of an agricultural work vehicle, the method comprising:

providing, with one or more computing devices, an input signal to the height control system to adjust a height of the implement relative to the ground surface, wherein providing the input signal to the height control system comprises iteratively providing step input signals to the height control system;

monitoring, with the one or more computing devices, the height of the implement relative to the ground surface;

adjusting, with the one or more computing devices, at least one gain of the height control system by iteratively increasing the at least one gain of the height control system concurrently with providing the step input signals to the height control system, wherein iteratively increasing the at least one gain of the height control system concurrently with providing the step input signals to the height control system comprises increasing the at least one gain of the height control system until the at least one gain of the height control system is approximately equal to the maximum stability gain of the height control system;

determining, with the one or more computing devices, a maximum stability gain of the height control system based on the at least one gain and the monitored height and storing, in a non-transitory computer-readable media, the at least one gain when the at least one gain is approximately equal to the maximum stability gain, wherein the maximum stability gain corresponds with a stability point of the height control system at which the height control system transitions from stable to unstable; and setting, with one or more computing devices, the at least one gain of the height control system based on the maximum stability gain.

2. The method of claim 1, wherein the input signal is provided to the height control system and the height of the implement relative to the ground surface is monitored while the agricultural work vehicle is stationary.

3. The method of claim 1, wherein providing the input signal to the height control system comprises providing a step input signal to the height control system.

4. The method of claim 1, wherein adjusting the at least one gain of the height control system comprises setting an integral signal gain and a derivative signal gain equal to zero and increasing a proportional signal gain.

5. The method of claim 1, further comprising determining an oscillation period of the height control system for the maximum stability gain.

6. The method of claim 5, wherein determining the oscillation period of the height control system for the maximum stability gain comprises measuring a peak-to-peak time interval of the monitored height of the implement relative to the ground surface when the height control system is set at the maximum stability gain.

7. The method of claim 6, wherein setting the at least one gain of the height control system based on the determined maximum stability gain comprises setting the at least one gain of the height control system based on each of the determined maximum stability gain and the determined oscillation period of the height control system for the maximum stability gain.

8. The method of claim 1, wherein setting the at least one gain comprises setting each of a proportional signal gain, an integral signal gain, and a derivative signal gain of the height control system based on the determined maximum stability gain.

9. A height control system for an implement of an agricultural work vehicle, the height control system comprising:
   an implement;
   an implement height sensor configured to detect a height of the implement relative to a ground surface;
   an implement controller communicatively coupled to the implement height sensor, the implement controller including a processor and associated memory, the memory storing instructions that, when executed by the processor, configure the implement controller to perform operations including:
   providing an input signal to the height control system to adjust the height of the implement relative to the ground surface, wherein providing the input signal to the height control system comprises iteratively providing step input signals to the height control system;
   monitoring the height of the implement relative to the ground surface based on signals received from the implement height sensor;
   adjusting at least one gain of the height control system by iteratively increasing the at least one gain of the height control system concurrently with providing the step input signals to the height control system, wherein iteratively increasing the at least one gain of the height control system concurrently with providing the step input signals to the height control system comprises increasing the at least one gain of the height control system until the at least one gain of the height control system is approximately equal to the maximum stability gain of the height control system;
   determining a maximum stability gain of the height control system based on the at least one gain and the monitored height and storing, in a non-transitory computer-readable media, the at least one gain when the at least one gain is approximately equal to the maximum stability gain, Wherein the maximum stability gain corresponds with a stability point of the height control system at which the height control system transitions from stable to unstable; and
   setting the at least one gain of the height control system based on the maximum stability gain.

10. The system of claim 9, wherein the input signal is provided to the height control system and the height of the implement relative to the ground surface is monitored while the agricultural work vehicle is stationary.

11. The system of claim 9, wherein providing the input signal to the height control system comprises providing a step input signal to the height control system.

12. The system of claim 9, wherein adjusting the at least one gain of the height control system comprises setting an integral signal gain and a derivative signal gain equal to zero and increasing a proportional signal gain.

13. The system of claim 9, wherein the operations further comprise determining an oscillation period of the height control system for the maximum stability gain.

14. The system of claim 13, wherein determining the oscillation period of the height control system for the maximum stability gain comprises measuring a peak-to-peak time interval of the monitored height of the implement relative to the ground surface when the height control system is set at the maximum stability gain.

\* \* \* \* \*